United States Patent

Peng et al.

[11] Patent Number: 5,954,853
[45] Date of Patent: Sep. 21, 1999

[54] METHOD AND APPARATUS FOR APPLYING A SIZING COMPOSITION TO GLASS FIBERS

[75] Inventors: Hong Peng, Pickerington; Guang Gao, Newark; Thomas O. Matteson, Pickerington, all of Ohio

[73] Assignee: Owens Corning Fiberglas Technology, Inc., Summit, Ill.

[21] Appl. No.: 08/775,817

[22] Filed: Dec. 31, 1996

[51] Int. Cl.$^6$ .................................................. C03B 37/022
[52] U.S. Cl. ............................... 65/443; 65/453; 65/500; 65/529; 118/234
[58] Field of Search ............................... 65/438, 453, 443, 65/500, 504, 529, 450, 447; 118/208, 238, 234, 57, 241

[56] References Cited

U.S. PATENT DOCUMENTS

| | | |
|---|---|---|
| 2,272,588 | 2/1942 | Simison . |
| 2,781,021 | 2/1957 | Schmitz .................................. 118/234 |
| 2,861,393 | 11/1958 | Whitehurst et al. . |
| 2,968,278 | 1/1961 | Wolfe . |
| 3,498,262 | 3/1970 | Hill et al. . |
| 3,819,344 | 6/1974 | Thunn ........................................ 65/504 |
| 3,821,543 | 6/1974 | Gelin ......................................... 65/500 |
| 3,865,565 | 2/1975 | Spence et al. . |
| 3,869,268 | 3/1975 | Briar ......................................... 65/453 |
| 3,961,601 | 6/1976 | Hunter ...................................... 118/57 |
| 3,997,308 | 12/1976 | Drummond ............................... 65/500 |
| 4,013,435 | 3/1977 | Kane et al. . |
| 4,015,559 | 4/1977 | Sears et al. . |
| 4,042,360 | 8/1977 | Kane et al. . |
| 4,071,341 | 1/1978 | Bohy ......................................... 65/500 |
| 4,088,468 | 5/1978 | Roberson . |
| 4,115,088 | 9/1978 | Walker . |
| 4,168,959 | 9/1979 | Loeffler . |
| 4,170,459 | 10/1979 | Myers ....................................... 65/453 |
| 4,192,252 | 3/1980 | Paul . |
| 4,192,663 | 3/1980 | Schmandt ................................ 118/238 |
| 4,222,344 | 9/1980 | Parbhoo . |
| 4,537,610 | 8/1985 | Armstrong et al. . |
| 4,579,078 | 4/1986 | French et al. . |
| 5,011,523 | 4/1991 | Roncato et al. . |
| 5,055,119 | 10/1991 | Flautt et al. . |
| 5,316,561 | 5/1994 | Roncato et al. . |
| 5,443,611 | 8/1995 | Salvador et al. . |
| 5,671,826 | 9/1997 | Zenoni ..................................... 118/234 |

FOREIGN PATENT DOCUMENTS 270970  5/1970  U.S.S.R. .................................. 65/500

*Primary Examiner*—John Hoffmann
*Attorney, Agent, or Firm*—C. Michael Gegenheimer; Inger H. Eckert

[57] ABSTRACT

A method and apparatus are provided for producing uniformly sized glass fibers. A heated bushing supplies streams of molten glass to be drawn into continuous fibers, and a drawing device attenuates the streams into fibers. A sizing applicator has a coating element engaging the drawn fibers, which applies a coating of sizing composition to the fibers. A shoe spaced from the applicator engages the fibers and causes the fibers to sweep back and forth across the element.

13 Claims, 3 Drawing Sheets

FIG. 1
FIG. 2
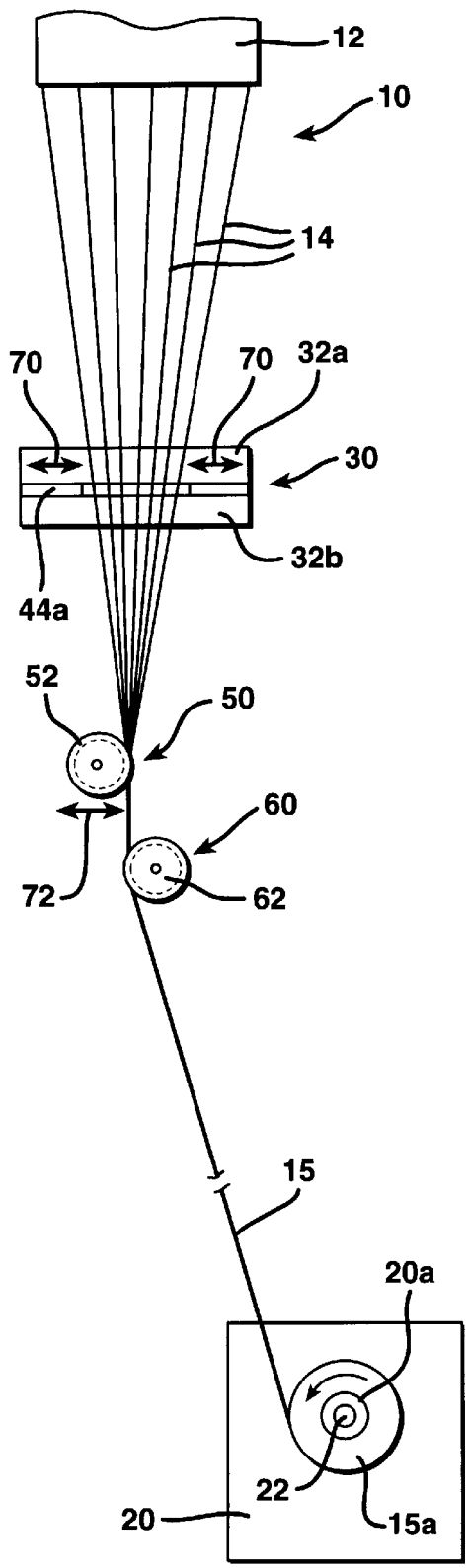
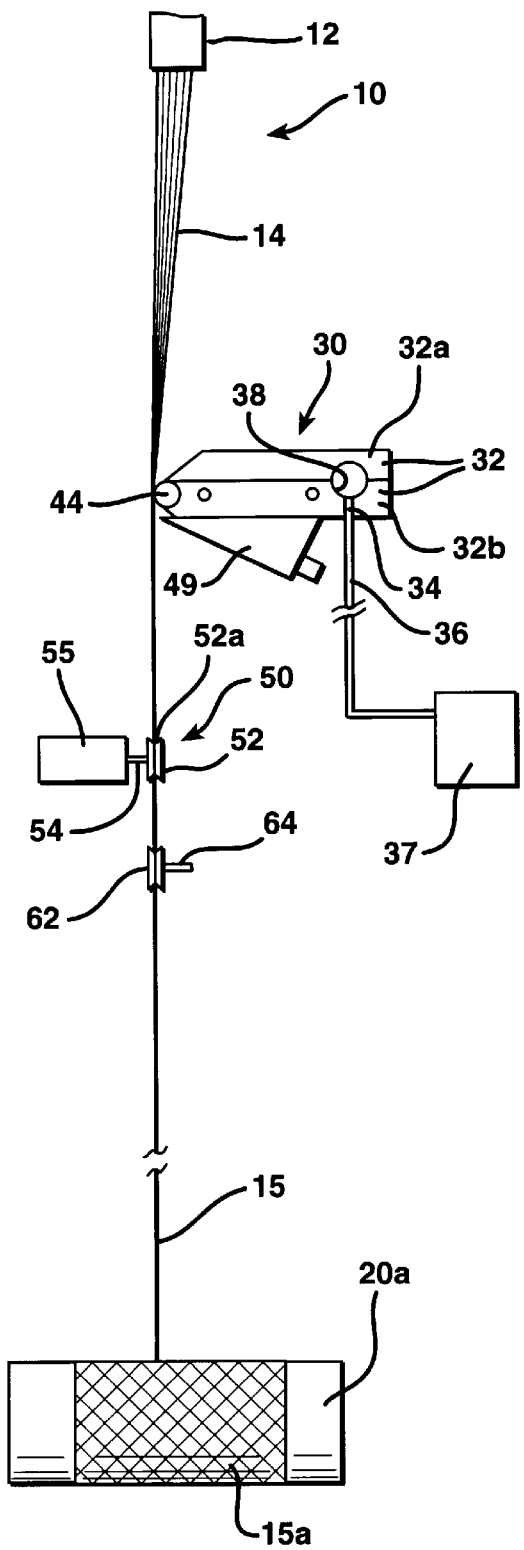

METHOD AND APPARATUS FOR APPLYING A SIZING COMPOSITION TO GLASS FIBERS

TECHNICAL FIELD AND INDUSTRIAL APPLICABILITY OF THE INVENTION

The present invention relates to a method and apparatus for applying a sizing composition to glass fibers. The method and apparatus of the present invention are applicable for use in a fiber-forming operation.

BACKGROUND OF THE INVENTION

Glass fiber packages are commonly manufactured by supplying molten glass to a bushing, drawing glass fibers from the bushing, and applying a size, which may be aqueous or nonaqueous, to the fibers via an applicator roll. The sized fibers may be gathered into a strand at a gathering shoe and wound on a collet to produce a glass fiber package.

U.S. Pat. No. 4,537,610 discloses an applicator for applying a nonaqueous sizing composition to glass fibers. The applicator includes a driven roll which receives sizing from a chamber and applies the sizing to the surface of glass fibers which are drawn across it. One problem common to applicators having driven rolls is "fiber wrap." This problem occurs when the fibers adhere to the surface of the size-coated driven roll such that the fibers become wrapped about the roll. Such a problem is costly as it results in a shutdown of the fiber-forming process. A further problem experienced by nonaqueous-size applicators is that such applicators often do not apply a uniform coating of the nonaqueous sizing composition to the glass fibers drawn across the applicator roll.

Accordingly, there is a need for an improved apparatus for applying a nonaqueous sizing composition to glass fibers.

SUMMARY OF THE INVENTION

This need is met by the present invention whereby an improved apparatus is provided for applying a generally uniform coating of a nonaqueous sizing composition to glass fibers.

In accordance with a first aspect of the present invention, an apparatus is provided for producing sized glass fibers. The apparatus comprises a heated bushing for supplying streams of molten glass to be drawn into continuous fibers; a device adapted to draw the streams into fibers; a sizing applicator having an element which engages the fibers and applies a coating of sizing composition to the fibers; and a shoe or means spaced from the applicator for engaging the fibers and causing the fibers to sweep back and forth across the element.

The drawing device may comprise a conventional winder or a chopper.

Preferably, the shoe comprises a reciprocating member, such as a first roll. A shaft is eccentrically coupled to the roll such that rotation of the shaft effects back-and-forth movement of the fibers. Alternatively, the reciprocating member may comprise a nonrotating element which moves, for example, back and forth in a horizontal plane. The nonrotating element is provided with an engagement surface for contacting the fibers to effect movement of the fibers back and forth along the outer surface of the sizing applicator element.

The apparatus may further include a second shoe spaced from the first shoe for engaging the fibers after they have passed over the first shoe. The second shoe preferably comprises a second roll and a second shaft.

The sizing applicator preferably comprises a housing having a supply port adapted to receive sizing composition from a sizing supply or source, a cavity connected to the supply port for receiving the sizing composition from the supply port, and a passageway extending from the cavity and terminating at an exit slot. The passageway receives the sizing composition from the cavity and delivers the sizing composition to the exit slot. The housing supports the element such that the element receives the sizing composition discharged at the exit slot. Preferably, the element comprises a stationary element. The sizing applicator may further include at least one heating cartridge.

The passageway has a given or predetermined length and the cavity is generally circular in cross section and has a given diameter. In a preferred embodiment, the ratio of the length to the diameter is equal to or exceeds about 10.

In accordance with another aspect of the present invention, a sizing applicator is provided for applying a coating of sizing composition to glass fibers. The sizing applicator comprises a housing and an applicator element supported by the housing. The housing includes a supply port adapted to receive sizing composition from a sizing supply source, a cavity connected to the supply port for receiving the sizing composition from the supply port, and a passageway extending from the cavity and terminating at an exit slot. The passageway receives the sizing composition from the cavity and delivers the sizing composition to the exit slot. The passageway has a given length and height and the cavity has a given diameter, with the ratio of the length to the diameter being equal to or exceeding about 10 and the ratio of the diameter to the height being equal to or exceeding about 167. The applicator element is positioned to receive the sizing composition discharged at the exit slot and is capable of applying a coating of sizing composition to glass fibers drawn over the element in a reciprocating manner.

In accordance with a further aspect of the present invention, a method is provided for applying a sizing composition to glass fibers. The method comprises the steps of: passing the fibers across a coating element or device supplied with a sizing composition such that the sizing composition is coated on the fibers; and contacting the sized fibers with a shoe spaced from the element to cause the fibers to sweep back and forth across the element.

In a preferred embodiment, the coating element is supplied with a nonaqueous-based size.

The method may further comprise the step of contacting the sized fibers with a second shoe spaced from the first shoe.

In accordance with yet another aspect of the present invention, a method is provided for producing sized glass fibers comprising the steps of: drawing a plurality of glass fibers from a source of molten glass; passing the fibers across a coating element provided with a sizing composition such that the sizing composition is coated onto the fibers; and contacting the sized fibers with a shoe spaced from the element to cause the fibers to sweep back and forth across the element.

Accordingly, an object of the present invention is to provide an improved sizing applicator for applying a generally uniform coating of sizing composition to glass fibers. A further object of the present invention is to provide an advantageous method for applying a sizing composition to glass fibers. Such objects are achieved through a system for producing sized glass fibers which includes a means spaced from a sizing applicator for engaging the fibers and causing the fibers to sweep back and forth across a coating element of the sizing applicator.

The above-discussed and other aspects, objects, features, and advantages of the invention will be apparent from the detailed description below and the appended drawing figures, wherein like reference numbers refer to like elements.

BRIEF DESCRIPTION OF THE DRAWINGS

FIG. 1 is a front view of a preferred embodiment of an apparatus constructed in accordance with the present invention for producing sized glass fibers.

FIG. 2 is a side view of the apparatus illustrated in FIG. 1.

DETAILED DESCRIPTION AND PREFERRED EMBODIMENTS OF THE INVENTION

Figure 3:
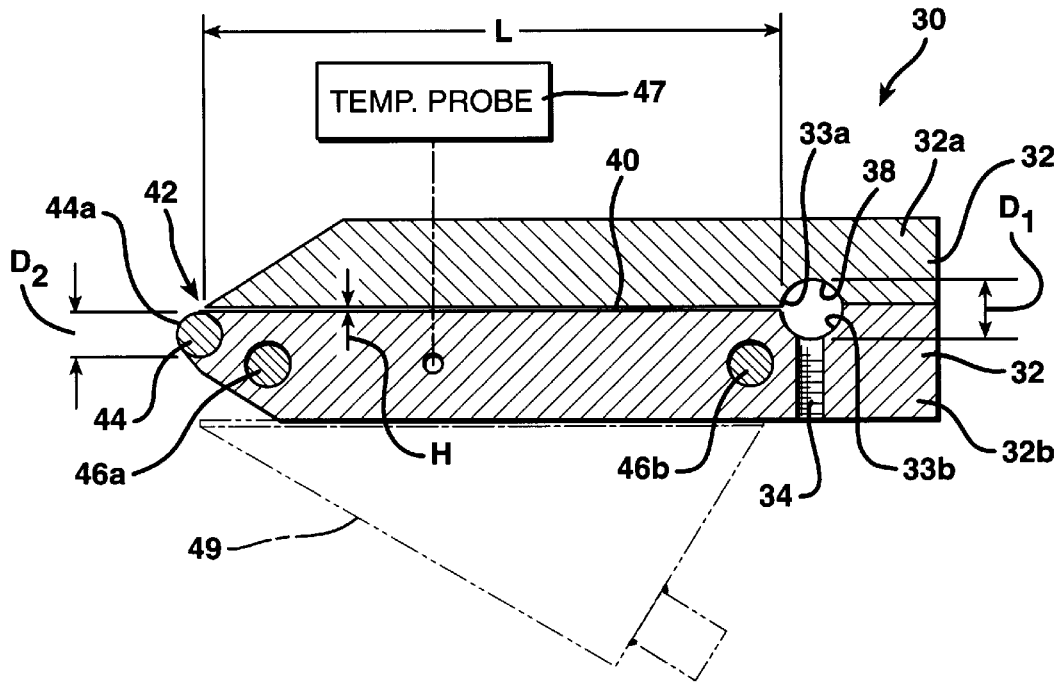
FIG. 3 is a cross-sectional view of the sizing applicator illustrated in FIGS. 1 and 2.

An apparatus for producing sized glass fibers in accordance with the present invention is shown in FIG. 1, and is generally designated by the reference numeral 10. The apparatus 10 comprises a bushing 12 having a number of orifices (not shown) through which a plurality of streams of molten glass are discharged. The orifices may be extended by hollow studs or tips (not shown). The streams of glass are mechanically drawn to form continuous fibers 14 via a winder device 20. A conventional chopper (not shown) may be used in place of the winder device 20. The fibers 14 pass across a sizing applicator 30 which applies a uniform coating of sizing composition (also referred to herein as size) to the fibers 14. The sizing compositions applied by the applicator 30 are preferably nonaqueous-based, but may be of any other suitable type.

The sizing applicator 30 comprises a housing 32 having upper and lower stainless steel sections 32a and 32b (see FIGS. 2 and 3). In the illustrated embodiment, the lower section 32b is provided with a supply port 34 adapted to receive a liquid sizing composition from a sizing supply or source pump 37. The pump 37 receives the sizing composition from a conventional heated holding container (not shown). A heated hose 36 is interposed between the sizing applicator 30 and the sizing supply pump 37 for providing a heated path for the sizing composition to take as it travels from the pump 37 to the housing 32. The hose 36 is connected to the port 34 and the supply pump 37 via conventional swivel fittings. Preferably, the pump 37 is of a type capable of supplying the size at a very precise and constant flow rate. In the illustrated embodiment, the sizing pump 37 comprises a conventional gear pump, such as a Zenith Pump, model HPB1.752 (available from Parker Hannifin Corporation, Sanford, N.C.). A preferred heated hose 36 is available from Technical Heater, Inc., under product number 212-10-10. In a preferred embodiment, two or more supply ports 34 are provided in the lower section 32b. Supply ports 34 may optionally be provided in the upper section 32a.

Figure 4:
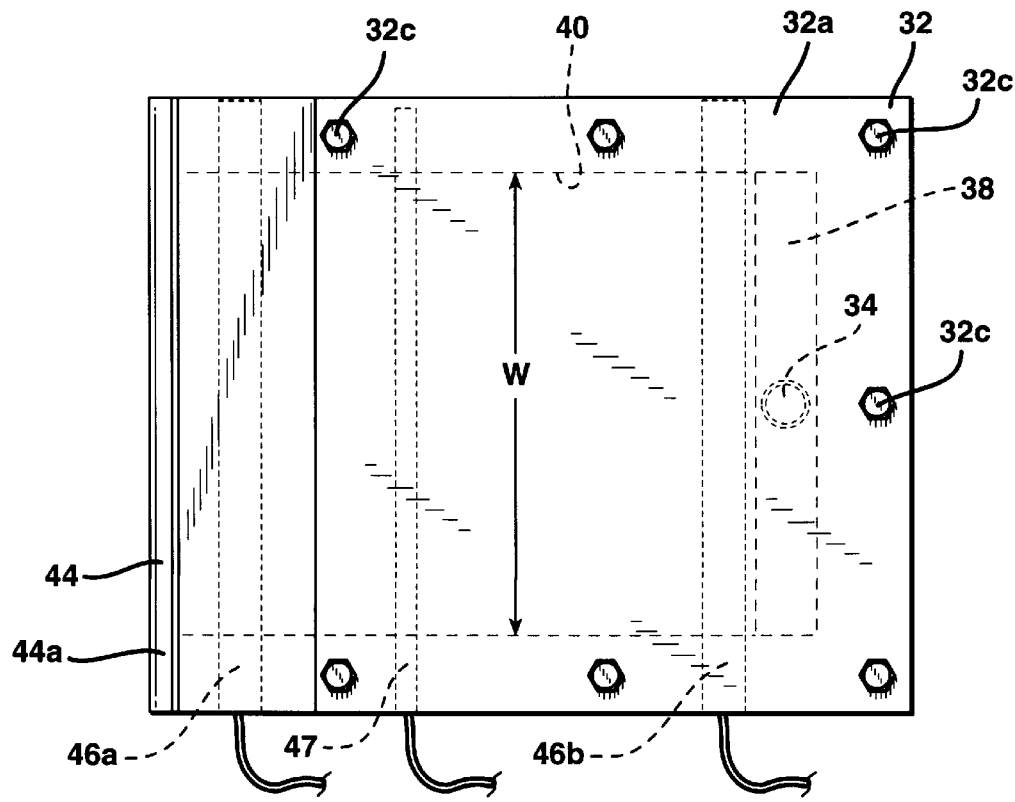
FIG. 4 is a plan view of the sizing applicator illustrated in FIGS. 1 and 2.

The upper and lower housing sections 32a and 32b have opposing notches 33a and 33b, which, when the housing sections 32a and 32b are joined to one another via conventional bolts 32c, define a cavity 38 for receiving the sizing composition from the supply port 34 (see FIG. 3). The supply port 34 communicates with the cavity 38. A passageway 40 extends from the cavity 38 and terminates at an exit slot 42. The passageway 40 receives the sizing composition from the cavity 38 and delivers the sizing composition to the exit slot 42. In the illustrated embodiment, the cavity is cylindrical in shape and has a diameter, $D_1$, equal to 0.5 inch (0.0127 meter). The passageway 40 has a length, L, equal to 5 inches (0.127 meter), a height, H (i.e., the space between the upper and lower housing sections 32a and 32b), equal to 0.003 inch ($7.62 \times 10^{-5}$ meter), and a width, W, equal to 6 inches (0.1524 meter) (see FIGS. 3 and 4). The passageway 40 may be defined by a recess machined into one of the upper and lower housing sections 32a and 32b, by recesses machined into both of the housing sections 32a and 32b, or by a gasket (not shown) interposed between the upper and lower housing sections 32a and 32b.

Preferably, the diameter ($D_1$) of the cavity 38 is sufficiently large such that there is negligible pressure drop in the cavity 38. The passageway 40 is sized such that there is a large pressure gradient in the flow direction, i.e., from the cavity 38 to the exit slot 42, which results in the nonaqueous sizing composition being delivered to the slot 42 in the form of a thin liquid sheet of uniform thickness. The pressure gradient along the passageway 40 is proportional to the passageway length (L) and inversely proportional to the cube of the passageway height (H). It is preferred that the ratio of the passageway length to the cavity diameter (i.e., $L/D_1$) be equal to or greater than about 10, and that the ratio of the cavity diameter to the passageway height (i.e., $D_1/H$) be equal to or greater than about 167.

The housing 32 fixedly supports a coating element 44, preferably a graphite stationary roll as shown in the illustrated embodiment, such that the element 44 receives the sizing composition discharged at the exit slot 42. The element diameter, $D_2$, is equal to 0.375 inch ($9.525 \times 10^{-3}$ meter). The fibers 14 move past and engage the stationary element 44 as they are drawn downwardly by the winder device 20 such that they receive a generally uniform coating of sizing composition from the element 44.

The sizing applicator 30 further includes, in the illustrated embodiment, first and second heating cartridges 46a and 46b for maintaining the housing 32 at an elevated temperature, e.g., at a temperature of from about 60° F. to about 400° F. (about 16–204° C.). A conventional temperature probe 47 is also provided for sensing the temperature of the housing and providing a temperature signal to a temperature controller (not shown). The temperature controller controls power to the heating cartridges 46a and 46b. A catch pan 49 is provided beneath the lower section 32a for catching excess sizing composition.

A first shoe 50 is spaced from the applicator 30 for engaging the fibers 14 and causing the fibers 14 to sweep back and forth across the element 44 in opposing directions, which directions are generally parallel to the central axis of the element 44 (see arrows 70 in FIG. 1). The shoe 50 comprises a first roll 52 eccentrically coupled to a shaft 54 such that rotation of the shaft 54 via a motor 55 effects back-and-forth movement of the roll 52 and, hence, the fibers 14. The roll 52 has a recessed outer periphery 52a adapted to receive the moving fibers 14. By causing the fibers 14 to sweep back and forth across the outer surface 44a of the stationary element 44, dripping of size from the element 44 is reduced and a more uniform coating of sizing composition is applied to the fibers 14.

Figure 5:
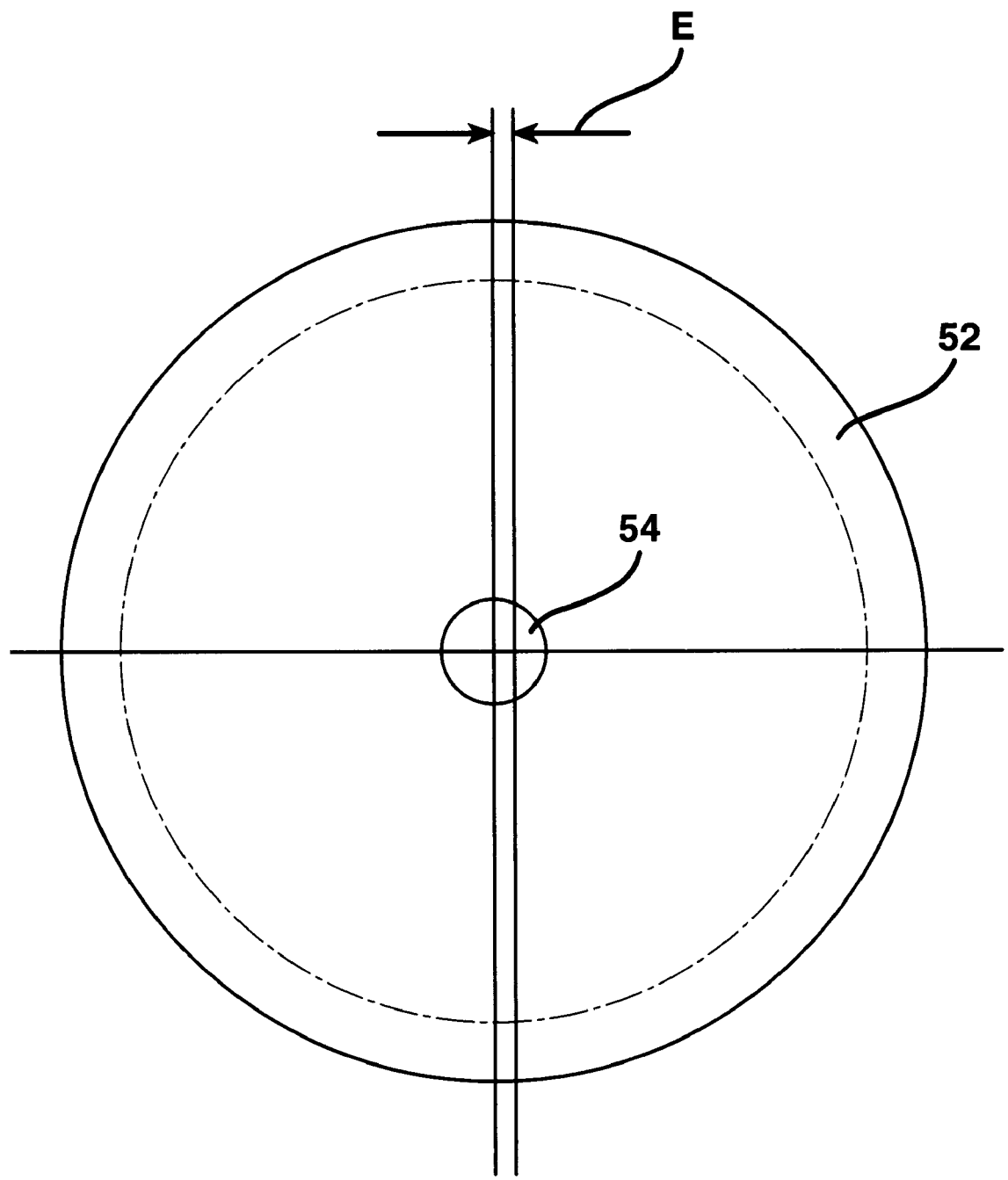
FIG. 5 is a front view of the first roller of the first shoe illustrated in FIGS. 1 and 2.

Preferably, the first roll 52 rotates at a rate of about 5–150 revolutions per minute (RPM). The shaft 54 is eccentrically coupled to the roll 52 such the shaft/roll eccentricity, E (see FIG. 5), is from about 0.0625 inch (1.587 ×10⁻³ meter) to about 0.125 inch (3.175×10⁻³ meter). Hence, the recessed outer periphery 52a of the roll 52 moves with a lateral amplitude equal to the value of E. Consequently, the fibers 14 translate back and forth at the roll 52 in opposing directions (designated by arrow 72 in FIG. 1) through a distance equal to the value of E.

The first shoe may alternatively comprise a nonrotating element (not shown) which moves or reciprocates, for example, back and forth in a horizontal plane. The nonrotating element is provided with an engagement surface for contacting the fibers 14 to effect movement of the fibers 14 back and forth along the outer surface 44a of the sizing applicator element 44.

Further provided is a second shoe 60 spaced from the first shoe 50 for engaging the fibers 14 after they have passed over the first shoe 50. The second shoe 60 comprises a second roll 62 and a second shaft 64. The second shaft 64 is fixedly mounted such that the roll 62 does not rotate.

The fibers 14 are gathered together into a single tow 15 via the shoes 50 and 60. From the second shoe 60 the tow 15 is wound via the winder 20 onto a sleeve or tube 20a to form a fiber package 15a. The winder device 20 comprises a rotatable member or a collet 22, upon which is provided the removable tube 20a. The winder device 20 also includes a conventional traversing mechanism (not shown) to distribute the tow 15 along the length of the tube 20a.

The following non-limiting examples are given to illustrate the invention and its advantages. Example 1 is an example in accordance with the invention, while Examples 2–4 are comparative examples.

EXAMPLE 1

A single-end product, i.e., a Type-30® product (Owens Corning), was made using the apparatus illustrated in FIGS. 1–5. The apparatus 10 was modified such that the width (W) of the passageway 40 was 2 inches (5.08×10⁻² meters). The passageway 40 was centrally located in the housing 32. The shaft/roll eccentricity (E) of the first shoe 50 was 0.25 inch (6.35×10⁻³ meter). The bushing 12 included 2000 openings. E-glass fibers were pulled at a speed of 975 feet/minute (297 meters/minute) at a yield of 225 yards/pound (0.453 meters/grams). A nonaqueous sizing composition was applied at an application rate of 40 grams/minute. The temperature of the hose 36 was 200° F. (93° C.). The temperature of the housing 32 was 220° F. (104° C.). The temperature of the sizing composition in the housing 32 just before exiting the slot 42 was 220° F. (104° C.). The viscosity of the size at 220° F. (104° C.) was 280 centipoise.

The size included on a percent by weight as received basis the following: 33.78% of a low molecular weight epoxy available from The Dow Chemical Company under the tradename DOW DER 337; 33.78% of a medium molecular weight epoxy available from Ciba-Geigy Corporation under the tradename Avaldite GT7013; 3.79% of a polyoxypropylene-polyoxyethylene block copolymer surfactant available from BASF Corporation under the tradename Pluronic L101; 11.05% of a polyoxypropylene-polyoxyethylene block copolymer surfactant available from BASF Corporation under the tradename Pluronic P105; 5% of polyethylene glycol 400 monooleate lubricant available from Henkel Corp. under the tradename Emerest 2646; 10% of a silane coupling agent available from OSI Industries under the tradename A174; 2.5% of butoxy ethyl stearate fattyacid ester lubricant available from Stepan Company under the tradename KESSCO BES; and 0.10% of an optical brightener available from Ciba-Geigy Corporation under the tradename Uvitex OB.

The sizing composition was prepared as follows: the GT7013 was added to a suitable container and heated until it became fluid (heated to about 150–200° F. (66–93° C.)); the DER 337 was added to the container and heated until its viscosity dropped (heated to about 190° F. (88° C.)); the Pluronic L101 was added directly to the container and the mixture was stirred; the Pluronic P105 was added directly to the container and the mixture was stirred; the PEG400MO was added directly to the container and the mixture was stirred; the BES was added directly to the container and the mixture was stirred; the A174 was added directly to the container and the mixture was stirred; and Uvitex OB was added with agitation to facilitate good dispersion.

A conventional loss on ignition (LOI) method was used to determine the amount of organic compounds in the sizing applied or loaded onto the tow, which was formed using the apparatus 10 of the present invention. The LOI values for three samples taken from the tow, each five yards in length, were determined. The samples were taken after about one pound (454 g) of tow had been removed from the package. The average of the three LOI values was 5.2%. The variation in the LOI values was 6.51%. Variation was determined from the following equation: Percent variation=((maximum LOI−minimum LOI)/(maximum LOI+minimum LOI))× 100.

EXAMPLE 2

Fibers of a tow were sized with the sizing composition set forth in Example 1 using a conventional applicator. The applicator included a slot which delivered the sizing composition to a rotating roll having a diameter of 0.375 inch (9.525×10⁻³ meter). The LOI values for three samples taken from the tow, each five yards in length, were determined as set forth in Example 1. The average LOI value was 2.9%. The variation in the LOI values was 7.64%.

EXAMPLE 3

Fibers of a tow were sized with the sizing composition set forth in Example 1 using a conventional applicator. The applicator included a slot which delivered the sizing composition to a rotating roll having a diameter of 0.75 inch (1.905×10⁻² meter). The LOI values for three samples taken from the tow, each five yards in length, were determined in the manner described in Example 1. The average LOI value was 5.8%. The variation in the LOI values was 9.48%.

EXAMPLE 4

Fibers of a tow were sized with the sizing composition set forth in Example 1 using a conventional applicator. The applicator included first and second sizing rolls. The first roll received the sizing composition from a trough and transferred the size to the second roll. The second roll then applied a coating of the sizing composition to the fibers. The LOI values for three samples taken from the tow, each five yards in length, were determined as in Example 1. The average LOI value was 4.3%. The variation in the LOI values was 34.9%.

Generally, the lower the variation in the LOI values, the more uniform the coating of sizing composition was on the fibers of the test samples. Accordingly, as can be discerned from the variation values set out in the above examples, a more uniform coating of sizing composition was applied to the fibers sized with the apparatus 10 of the present invention (the variation value in Example 1 was 6.51) than with any one of the three conventional applicators (the variation values in Examples 2–4 were 7.64, 9.48, and 34.9, respectively).

The invention has been described in detail and by reference to preferred embodiments. It will be apparent to artisans, however, that various modifications may be made without departing from the spirit of the invention. Thus, the invention is intended not to be limited by the foregoing specification, but to be defined by the appended claims and their equivalents.

What is claimed is:

1. An apparatus for producing sized glass fibers comprising:
    a bushing for supplying streams of molten glass to be drawn into continuous fibers;
    a drawing device for drawing said streams into the fibers;
    a sizing applicator comprising a coating element for contacting the fibers and applying a coating of sizing composition to the fibers; and
    a first shoe spaced from said applicator for engaging the fibers, said first shoe comprising a first roll eccentrically mounted on a first shaft such that said first roll and said first shaft have a shaft/roll eccentricity of from about 0.0625 inch to about 0.25 inch, rotation of said first shaft causes said first roll to rotate which in turn causes said fibers to translate back and forth at said coating element.

2. An apparatus as set forth in claim 1, wherein said drawing device comprises a winder.

3. An apparatus as set forth in claim 1, wherein said shoe comprises a reciprocating member.

4. An apparatus as set forth in claim 1, further comprising a second shoe spaced from said first shoe.

5. An apparatus as set forth in claim 4, wherein said second shoe comprises a second roll and a second shaft.

6. An apparatus as set forth in claim 1, wherein said sizing applicator further comprises a housing having a supply port for receiving the sizing composition from a sizing source, a cavity connected to said supply port for receiving the sizing composition from said supply port, and a passageway extending from said cavity and terminating at an exit slot, said passageway receiving the sizing composition from said cavity and delivering the sizing composition to said exit slot, said housing supporting said coating element such that said coating element receives the sizing composition discharged at said exit slot.

7. An apparatus as set forth in claim 6, wherein said coating element comprises a stationary element.

8. An apparatus as set forth in claim 6, wherein said sizing applicator further comprises at least one heating cartridge.

9. An apparatus as set forth in claim 6, wherein said passageway has a length and said cavity has a diameter, and the ratio of said length to said diameter is equal to or exceeds 10.

10. A method for coating a sizing composition onto glass fibers comprising the steps of:
    passing glass fibers across a coating element supplied with a sizing composition such that said sizing composition is coated onto said fibers to form sized fibers;
    contacting said sized fibers with a first shoe spaced from said coating element to cause said fibers to translate back and forth at said coating element; and
    contacting said sized fibers with a second shoe spaced from said first shoe.

11. A method as set forth in claim 10, wherein said sizing composition is nonaqueous.

12. A method for forming sized glass fibers comprising:
    drawing a plurality of glass fibers from a source of molten glass;
    passing said fibers across a coating element provided with a sizing composition such that said sizing composition is coated onto said fibers to form sized fibers;
    translating said fibers back and forth at said coating element; and
    contacting said fibers with a reciprocating show spaced from said coating element and contacting said sized fibers with a stationary shoe spaced from said reciprocating shoe.

13. A method as set forth in claim 12, wherein said sizing composition is nonaqueous.

* * * * *